Jan. 30, 1934.  J. S. ZOOK  1,945,016
BATTERY HAND LAMP
Filed Oct. 6, 1931  3 Sheets-Sheet 1
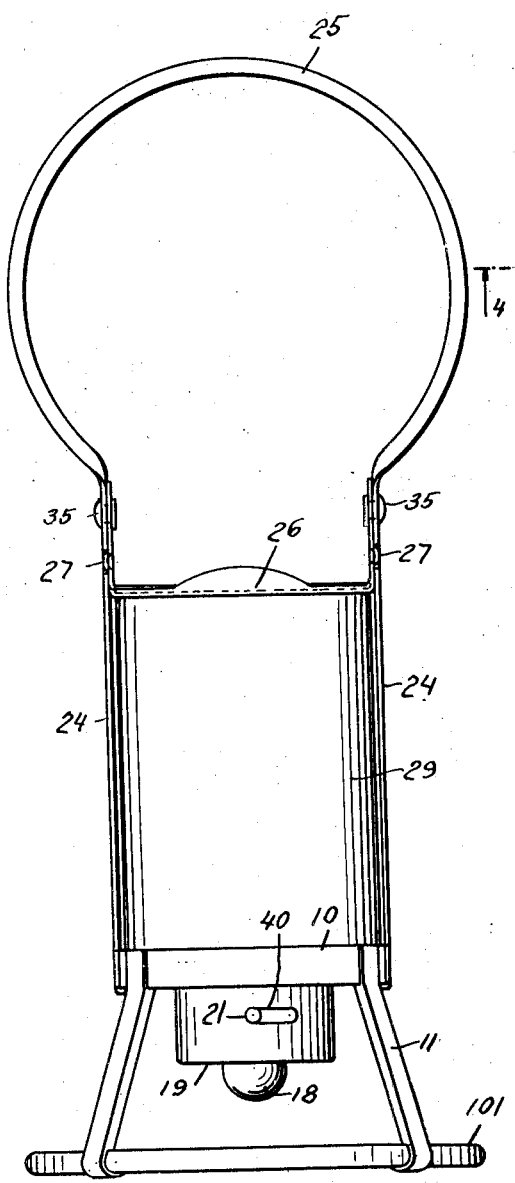
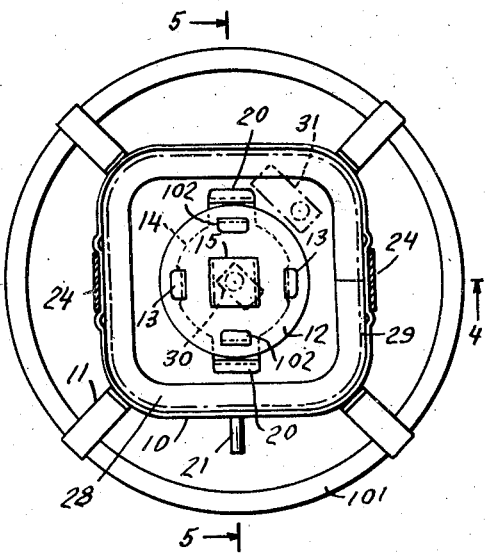
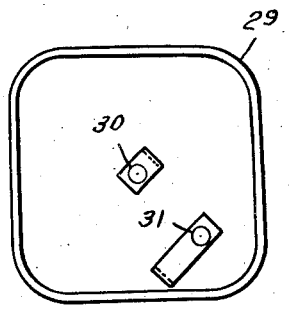
INVENTOR
J. S. Zook
BY
Pennie, Davis, Marvin & Edwards
ATTORNEYS

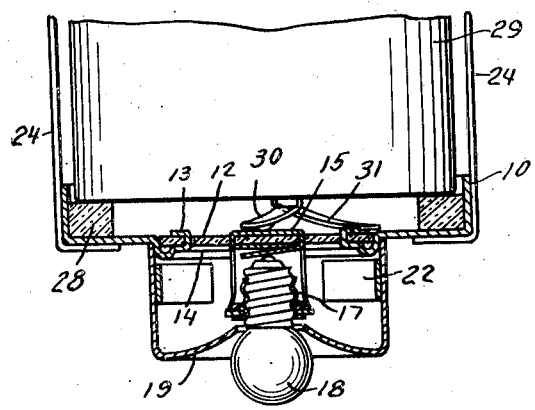
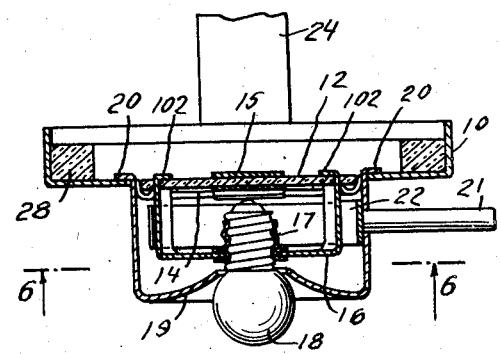
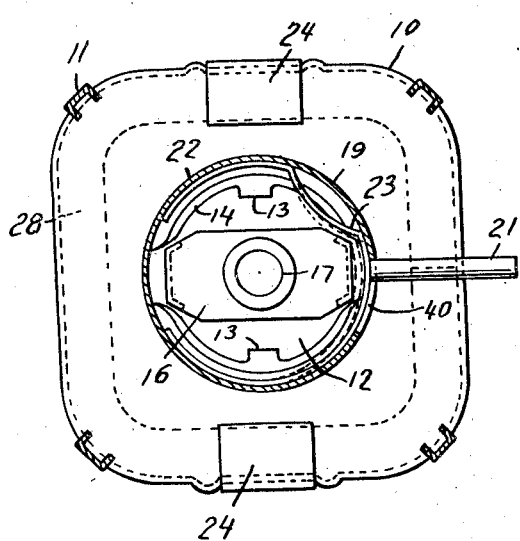
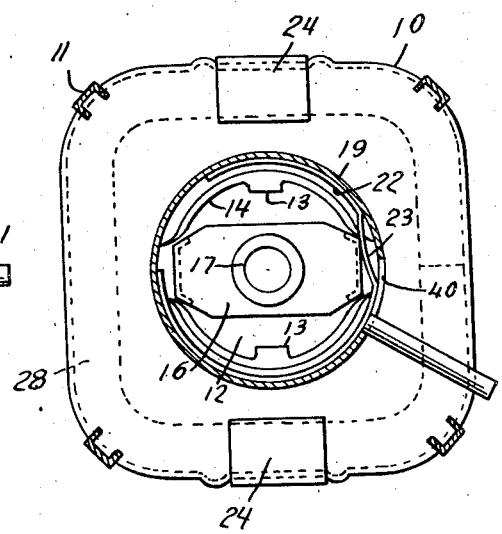

Jan. 30, 1934.  J. S. ZOOK  1,945,016
BATTERY HAND LAMP
Filed Oct. 6, 1931  3 Sheets-Sheet 3
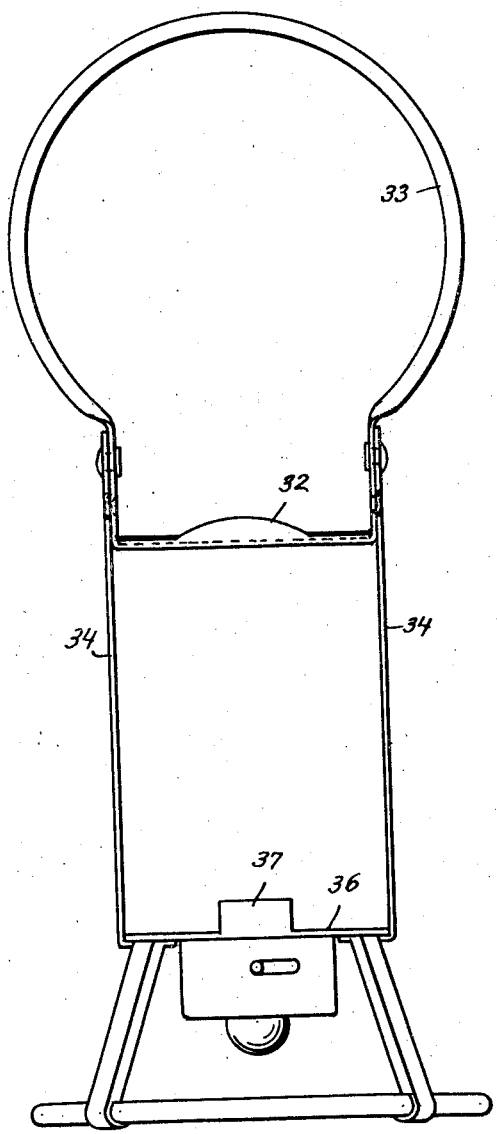
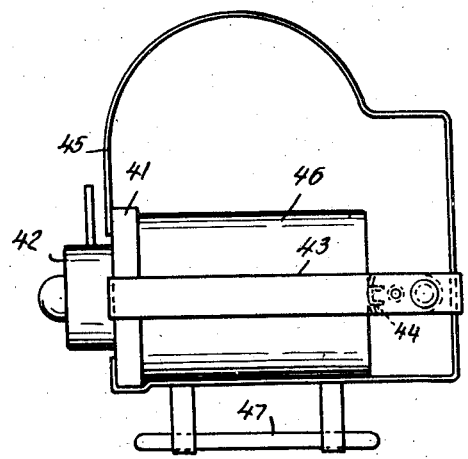
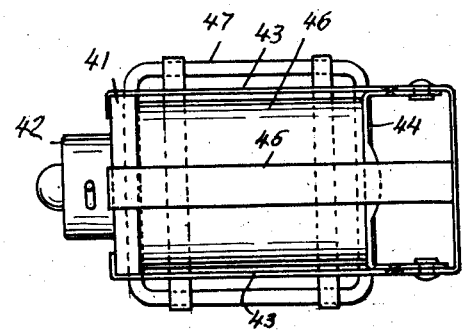
INVENTOR
J. S. Zook
BY
Pennie, Davis, Marvin & Edwards
ATTORNEYS Patented Jan. 30, 1934

1,945,016

UNITED STATES PATENT OFFICE 1,945,016

BATTERY HAND LAMP

John S. Zook, Madison, Wis., assignor to Burgess Battery Company, Madison, Wis., a corporation of Wisconsin Application October 6, 1931. Serial No. 567,190

10 Claims. (Cl. 240—10.63)

This invention relates to self-contained electric hand lanterns in which the electric energy is supplied by means of batteries.

It is the object of the invention to provide an electric hand lantern which is simple and inexpensive to manufacture. It is the particular object of the invention to provide an electric hand lantern which does not require a case or enclosure for the battery, and in which the battery is held in place upon an open support with its terminals in contact with those of an incandescent lamp circuit.

It is a further object of the invention to provide a hand lantern in which the battery is held permanently in an upright position with respect to its support and in which the battery terminals do not bear the pressure of the battery against the support and in which the battery does not become loose upon its support with use.

Fig. 1 is a vertical view of my improved hand lantern, assembled and in operative condition;

Fig. 2 is a plan view of the lamp supporting end of the device, showing the battery terminals in dotted lines;

Fig. 3 is a plan view of the terminal end of the battery;

Fig. 4 is a vertical sectional view of the open battery support and the lamp circuit which is mounted therein on line 4—4 of Fig. 2;

Fig. 5 is a sectional view at right angles to Fig. 2 on line 5—5 of Fig. 2;

Fig. 6 is a bottom view of the battery support and the lamp circuit along line 6—6 of Fig. 5 with the switch of such circuit in the open position;

Fig. 7 is a view similar to Fig. 6 with the switch in the closed position;

Fig. 8 is a vertical view of a modification of my improved hand lantern with the battery omitted showing a different means for holding the battery in place in the lantern;

Fig. 9 is a side view of a further modification of my improved hand lantern; and, Fig. 10 is a top view of the hand lantern shown in Fig. 9.

My improved hand lantern comprises a metal tray or pan 10 which has a body portion or bottom and sides substantially at right angles thereto and is supported by a bracket 11 of the ordinary type which may be spot welded or otherwise suitably attached thereto to make up a suitable standard for the hand lantern. The bracket terminates in a ring 101, which forms the base on which the lamp may rest. The lamp circuit of the lantern is mounted upon the under side of tray 10 as shown in Figs. 2, 4, 5, 6 and 7. There is a central circular opening in metal tray 10 within which insulating disc 12 is mounted. Slots are provided in opposite marginal portions of disc 12. Tongues 13 extend inwardly from the marginal portions of the central opening of metal tray 10, pass through the slots of disc 12 and are turned back upon themselves to fasten disc 12 permanently in place. Further marginal portions 14 of the opening of tray 10 are depressed and assist in supporting disc 12 substantially level with the bottom of tray 10. In the central portion of disc 12 there are two slots through which a metal plate or conducting member 15 is passed in such a manner as to expose a flat surface upon both sides of disc 12. The ends of plate 15 are arranged to occur upon the under side of disc 12 for reasons which will be explained hereinafter.

Two further slots are provided in the marginal portions of disc 12 and into these slots are introduced the reduced end portions 102 of a metallic bridge 16, which are turned substantially at right angles to lock bridge 16 in place upon disc 12. Substantially centrally of bridge 16 there is mounted bulb socket 17. Incandescent bulb 18 may be screwed into socket 17 with the end terminal of the former in contact with plate 15. Plate 15 is composed of spring metal and by arranging its end portions to project at a small angle from the under side of disc 12 resilient or spring contact is had between the bulb and the plate. Reflector member 19 is mounted upon the bottom of metal tray 10 by means of tongues 20 which project from the base of reflector 19 into peripheral portions of the opening of tray 10 and are turned at right angles so as to rest upon the upper side of the tray. Reflector 19 fits over depressed portions 14 of tray 10 and conceals the other members of the lamp circuit. Reflector 19 is provided with a central aperture which is aligned with socket 17 and through which bulb 18 is adapted to project.

Switch member 22 is mounted upon the inside of reflector 19. A slot 40 is provided in the side of reflector 19. A finger piece 21 is attached to switch member 22 and projects through this slot. Switch member 22 comprises a strip of spring metal constricted by reflector 19 substantially into the form of a circle open at the end opposite from the point at which finger piece 21 is attached thereto. At a point adjacent such point of attachment the curvature of member 22 is reversed to form an inwardly bulging section 23. In the position shown in Fig. 6 switch member 22 does not make contact with bridge 16 but if finger piece 21 is depressed longitudinally as indicated in dotted lines member 22 slides upon the inside surface of reflector 19, its end portions approach each other and the diameter of the circle which it represents is reduced against its spring tension. Finger piece 21 may thus be moved inwardly until its inner end or the inner side of switch member 22 contacts with bridge 16. When finger piece 21 is released the spring action of member 22 causes it to again resume its normal position shown in full lines in Fig. 6.

If finger piece 21 is now moved to the position shown in Fig. 7, member 22 slides in rotary fashion within reflector 19 and section 23 moves into contact with bridge 16 and the lamp circuit is closed. In this position, the mid-point of section 23 is arranged to occur slightly to the right of the adjacent corner of bridge 16 as viewed in Fig. 7 so that member 22 is normally urged toward the circuit-closing position.

Arms 24 are attached, as by spot welding, to opposite sides of metal tray 10. Arms 24 terminate in a handle 25. Between the upper portions of arms 24, a cam member 26 is pivotally mounted upon rivet-like members 35. Projections 27 are formed upon cam member 26 and when the latter is in the position shown in Fig. 1, projections 27 are adapted to engage cooperating indentations upon arms 24 to lock cam member 26 in position. Any other suitable locking means may be used.

There is arranged within tray 10, along the margin of its bottom portion, a strip 28 of resilient cushioning material such as sponge rubber. Tray 10 is adapted to receive a battery 29 of weatherproof construction and usually of the square, four cell lantern battery type, with its terminal end fitting within the sides of the tray and with its spring terminals 30 and 31 in contact with plate 15 and the bottom of tray 10 respectively. The marginal portions of the end of battery 29 rest upon cushioning member 28. After the battery is in place cam member 26 is moved into the position shown in Fig. 1 whereby the battery is pressed down upon cushioning member 28 and is maintained firmly in substantially fixed spaced relation with respect to tray 10.

It is common practice in electric hand lanterns to have the battery rest directly upon its projecting spring terminals and to maintain it in its position under pressure to prevent relative movement within the lantern casing. It has been found, however, that the battery frequently fails to maintain its upright position with respect to its support and that it tilts to one side occasionally causing disconnection between a terminal of the battery and the cooperating terminal of the lamp circuit in the support. It has also been found that permanent deformation of the spring terminals takes place with use with the result that the battery is no longer held within the casing in a state of compression and relative movement takes place. This also results in the battery terminals becoming disconnected from the terminals of the lamp circuit. Since one terminal lead is usually longer than the other and equal deformation will not occur at each one, difficulties of the above character are quite common.

A distinct advantage is obtained by the use of cushioning member 28 in that these difficulties are avoided. When cam 26 is moved into the position shown in Fig. 1, battery 29 is pressed down upon cushioning member 28 and the latter is compressed as shown in Fig. 4. Cushioning member 28 extends upon all sides of tray 10, and preferably is continuous, as indicated in Fig. 6. Hence it provides a support which holds battery 29 permanently in an upright position and at the same time absorbs shocks which the lantern may receive in handling so that loosening of the members of the assembly with use is prevented. The end of battery 29 is arranged to be sufficiently near to the bottom of tray 10 that terminals 30 and 31 always exert spring pressure against plate 15 and tray 10 respectively and their deflection is substantially constant. They do not bear the pressure of battery 29 and permanent deformation does not occur. Cushioning member 28, furthermore, provides a seal against water entering the lantern between battery 29 and tray 10 and causing a short circuit. Cushioning member 28 is water resistant and is preferably of resilient material such as sponge rubber but it serves as well as a support and spacing member to relieve terminals 30 and 31 of excessive compression if it is made of harder material, such as denser forms of rubber, leather, wood, etc.

With the switch member 22 in the position shown in Fig. 7, the electric circuit is completed from terminal 31 through the bottom of tray 10, reflector 19, switch member 22, bridge 16, bulb socket 17, incandescent bulb 18 and plate 15 to terminal 30. With the switch member in the position shown in solid lines in Fig. 6 the connection between reflector 19 and bridge 16 is broken and the circuit is open. Momentary or flashing connection is made by depressing finger piece 21 to the position shown by dotted lines in Fig. 6. It is not necessary to place battery 29 in a particular position within tray 10. It is merely necessary to arrange it so that it fits within the sides of the tray, since, as shown in Fig. 2, terminal 31 makes contact with the bottom of tray 10 and terminal 30 makes contact with plate 15, with the battery in any position.

My improved hand lantern is of simple, light weight construction and promotes the easy replacement of worn out batteries. To remove the battery cam member 26 is pivoted out of the position shown in Fig. 1 by pressing the thumb or finger against the finger piece which is provided. The battery may then be removed and another inserted in its place. Cam member 26 may then be returned to the position shown in Fig. 1 to fasten the new battery in place. The usual case for enclosing the battery is dispensed with, with a resulting saving in materials and simplification of manufacturing operations and the production of a lighter weight lantern.

In Figs. 9 and 10 there is illustrated a modification of my improved hand lantern in which the lantern is adapted to project its light forward instead of downward when it is being held by the handle. The lantern comprises a tray 41 upon which there is mounted a reflector 42 and a lamp circuit similar to that described heretofore. Projecting in the opposite direction from tray 41 is a pair of arms 43 with a cam member 44 pivotally mounted between their end portions. Attached to tray 41, as by spot welding, there is a strap member 45 which is bent to form a handle and practically encircles battery 46 in a direction at right angles to that in which arms 43 and cam member 44 encircle the battery. Strap 45 is removed from the upper side of battery 46, a distance sufficient to permit the insertion and removal of the battery between strap 45 and arms 43. Upon the lower portion of strap 45 there is attached a supporting bracket 47. In order to remove the battery cam member 44 is moved out of contact with the battery and the latter is removed between arms 43 and the upper portion of strap 45. The opposite procedure is followed in inserting the battery.

My invention is adapted for use in the construction of a caseless hand lamp or flashlight. For instance, supporting bracket 47 and strap 45 may be omitted entirely from the lantern heretofore described and the result is a structure which comprises a caseless flashlight which may be grasped about battery 46 and arms 43 in such a manner that the switch may be operated by the same hand. The same result is obtained if the handle and supporting bracket are removed from the lanterns shown in Figs. 1 and 8.

It is understood that the construction illustrated in the drawings may be modified in various ways. For instance, tray 10 may take various forms. It need only be a platform 36 with upwardly projecting stops 37 at its sides to prevent battery 29 from being displaced laterally as shown in Fig. 8. Cam member 32 may be a part of handle 33 which may be pivotally attached to arms 34 of the hand lantern. Individual cams may be mounted upon each of the arms of the hand lantern.

I claim:

1. A caseless hand lantern comprising, in combination, a metal pan having a bottom and sides, said bottom having a central opening therein, an insulating disc mounted in said opening, a metallic plate mounted upon said disc with portions exposed on both sides thereof, a metallic bridge suspended from said disc, a bulb socket mounted upon said bridge, said socket being adapted to receive an incandescent bulb with the end terminal thereof in contact with said plate, a metallic reflector suspended from said pan and in electrical connection therewith, a resilient member upon the marginal portions of the bottom of said pan, a battery arranged in said pan with its terminal end fitting within said sides and resting upon said resilient member, and the terminals contacting with said plate and the bottom of said pan respectively, a switch for connecting and disconnecting said reflector and said bridge, arms attached to opposite sides of said pan, and terminating in a handle, means disposed between said arms for maintaining said battery firmly in place upon said resilient member, and a supporting bracket attached to said pan.

2. A caseless hand lantern comprising, in combination, a sheet metal pan having sides and a bottom, the bottom having an opening therein, an insulating disc mounted in said opening, a metallic plate mounted upon said disc and having portions exposed on both sides of said disc, a metallic socket holder suspended from said disc, a bulb socket mounted upon said holder, an incandescent bulb in said socket with its end terminal in contact with one exposed portion of said plate, a metallic reflector suspended from said pan and in electrical connection therewith, means for electrically connecting and disconnecting said socket holder and said reflector, a battery arranged in said pan with its terminal end fitting within said sides, the terminals of said battery contacting with said plate and said bottom respectively, a supporting bracket attached to said pan, arms attached to opposite sides of said pan, means disposed between said arms for maintaining said battery firmly in position upon said pan, and a handle attached to said arms.

3. A caseless hand lantern comprising, in combination, a metal platform, said platform having an opening therein, a conducting member mounted within said opening and insulated from said platform, said platform being adapted to receive a battery with its terminal end resting thereupon and its terminals in contact with said conducting member and said platform respectively, a bulb socket mounted below said platform and insulated therefrom, said socket being adapted to receive an incandescent bulb with its end terminal in contact with said conducting member, means for electrically connecting and disconnecting said platform and said socket, a pair of arms attached to opposite sides of said platform, means disposed between said arms for maintaining said battery firmly in position upon said platform, a handle for said hand-lamp, and a supporting bracket attached to said hand-lamp.

4. A caseless hand lantern comprising, in combination, a metallic tray, said tray having an opening therein, a conducting member mounted within said opening and insulated from said tray, an electric circuit including an incandescent bulb mounted beneath said tray, said conducting member and said tray comprising the terminals of said circuit, a switch in said circuit, said tray being adapted to receive a battery with its terminal end resting thereon and its end terminals in contact with said conducting member and said tray respectively, a supporting bracket for said tray, arms attached to said tray, and means attached to said arms for maintaining said battery firmly in place on said tray.

5. A caseless hand lantern comprising, in combination, a standard, said standard comprising an open top tray and a supporting bracket attached thereto, said tray being adapted to receive the terminal end of an electric battery, arms attached to opposite sides of said tray, means disposed between said arms for maintaining said battery firmly in position upon said tray, an electric circuit including terminals and an incandescent bulb arranged within said standard, said terminals being exposed within said tray and being adapted to contact with the terminals of said battery, and means for opening and closing said electric circuit.

6. A caseless hand lantern comprising a platform, an electric circuit mounted upon the under side of said platform, said circuit including an incandescent bulb and a switch and having its terminals exposed in the upper side of said platform, said platform being adapted to receive the terminal end of an electric battery so that its terminals contact with the terminals of said circuit, a spacing member upon said platform, arms attached to said platform, and means disposed between said arms for pressing said battery against said spacing member.

7. A caseless hand lantern comprising a platform, an electric circuit including an incandescent bulb and a switch mounted upon said platform and having its terminals exposed upon said platform, a battery upon said platform with its terminals in contact with the terminals of said circuit, a pair of arms attached to said platform, means disposed between said arms for holding said battery firmly against said platform, and a resilient spacing member disposed between the marginal portions of said platform and the terminal end of said battery.

8. A caseless hand lantern comprising a metal tray, an electric circuit including an incandescent bulb and a switch mounted exteriorly of the bottom of said tray with its terminals exposed within said tray, said tray being adapted to receive an electric battery with its terminal end fitting therein and its terminals in contact with the terminals of said circuit, a resilient spacing member upon said tray against which said battery rests, a pair of arms attached to opposite sides of said tray, and means comprising a cam member disposed between said arms for holding said battery firmly in place within said pan.

9. In a battery hand lantern having a support for said battery with terminals exposed therein for engagement with the terminals of said battery, means for firmly positioning said battery with its terminal end removed a predetermined distance from said support comprising a spacing member resting upon said support and disposed between said support and the terminal end of said battery, said spacing member being of lesser height than the distance said battery terminals project from said battery, and a cam member mounted pivotally in spaced relation to said support for engaging and pressing said battery against said spacing member to thereby fix the position of said battery.

10. In a caseless battery hand lantern, a platform upon which one end of a battery is adapted to be positioned, arms extending from the opposite sides of said platform, and a cam member pivotally supported between said arms at a point removed from said platform and adapted to engage the other end of said battery and press said battery against said platform.

JOHN S. ZOOK.